(12) United States Patent
Niccolai

(10) Patent No.: US 10,118,284 B2
(45) Date of Patent: Nov. 6, 2018

(54) ROTATING CAP APPLIED TO THE BROOMSTICK PROVIDED WITH AN EYELET SO THAT IT CAN BE HUNG TO THE WALL

(71) Applicant: FASS S.P.A., Larciano (IT)

(72) Inventor: Celestino Niccolai, Larciano (IT)

( * ) Notice: Subject to any disclaimer, the term of this patent is extended or adjusted under 35 U.S.C. 154(b) by 113 days.

(21) Appl. No.: 14/428,587

(22) PCT Filed: Nov. 7, 2012

(86) PCT No.: PCT/IT2012/000338
§ 371 (c)(1),
(2) Date: Mar. 16, 2015

(87) PCT Pub. No.: WO2014/073008
PCT Pub. Date: May 15, 2014

(65) Prior Publication Data
US 2015/0239116 A1    Aug. 27, 2015

(51) Int. Cl.
*B25G 1/00* (2006.01)
*B25G 1/08* (2006.01)
*B25G 1/04* (2006.01)
*B25G 3/04* (2006.01)
*B23P 19/04* (2006.01)

(52) U.S. Cl.
CPC ............... *B25G 1/08* (2013.01); *B23P 19/04* (2013.01); *B25G 1/046* (2013.01); *B25G 3/04* (2013.01); *Y10T 29/49* (2015.01)

(58) Field of Classification Search
CPC .... B25G 1/00; B25G 1/08; A46B 5/00; Y10T 29/49

USPC ............................................. 15/143.1, 144.1
See application file for complete search history.

(56) References Cited

U.S. PATENT DOCUMENTS

| | | | | |
|---|---|---|---|---|
| 3,232,355 A | * | 2/1966 | Woolworth | A01B 1/227 16/430 |
| 4,064,587 A | | 12/1977 | Schnabl | |
| 6,003,187 A | * | 12/1999 | Footer | A47L 13/14 15/114 |
| 7,640,617 B2 | * | 1/2010 | Kennedy | A47L 13/20 15/144.1 |
| D665,960 S | * | 8/2012 | Menius | D32/51 |
| 2001/0004019 A1 | * | 6/2001 | Wakefield | A01B 1/24 172/22 |
| 2002/0026680 A1 | * | 3/2002 | Kingry | A47L 13/46 15/228 |

(Continued)

FOREIGN PATENT DOCUMENTS

DE    3004315 A1 *  8/1981  ............. A46B 17/00

OTHER PUBLICATIONS

English Translation of Weihrauch Doc. pp. 1-3.*

*Primary Examiner* — Michael Jennings
(74) *Attorney, Agent, or Firm* — Themis Law

(57) ABSTRACT

A broomstick for a broom includes a cap having a first part that is connected to an end of the broomstick and a second part provided with a hanging element configured to hang the broomstick to a wall. The connection between the first part of the cap and the broomstick is rotatable in such a way that the cap can rotate with respect to the broomstick and vice-versa, wherein, further, the cap is in a single piece in such a way that a rotation of the first part of the cap corresponds to a rotation of the second part of the cap.

12 Claims, 4 Drawing Sheets

(56) References Cited

U.S. PATENT DOCUMENTS

| | | |
|---|---|---|
| 2005/0045003 A1 | 3/2005 | Hsieh |
| 2006/0107476 A1* | 5/2006 | Mameletzi .............. A47L 17/04 15/105 |
| 2006/0200924 A1* | 9/2006 | Hampton ............. A46B 5/0033 15/144.3 |
| 2006/0207042 A1* | 9/2006 | Di Paolo ............. A46B 5/0095 15/111 |
| 2009/0211045 A1* | 8/2009 | Michelson ............... B25G 1/04 15/143.1 |

\* cited by examiner

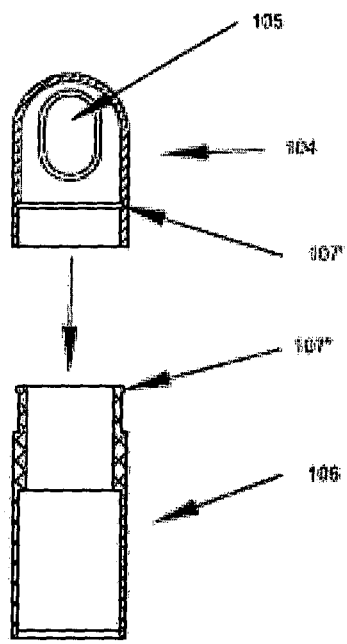
FIG. 2 (Prior Art)
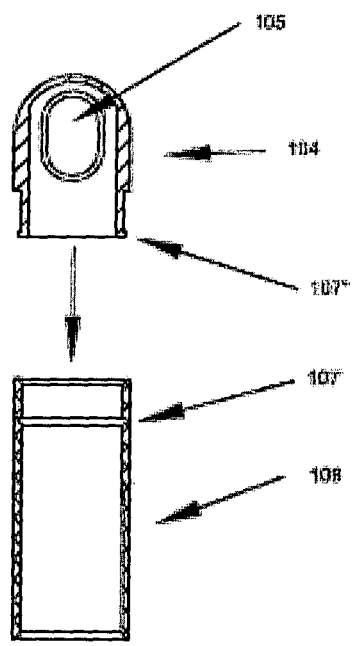
FIG. 2A (Prior Art)
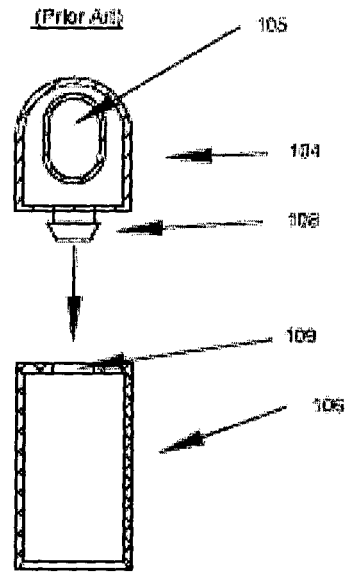
FIG. 2B (Prior Art)
FINAL PART WITH HOOK

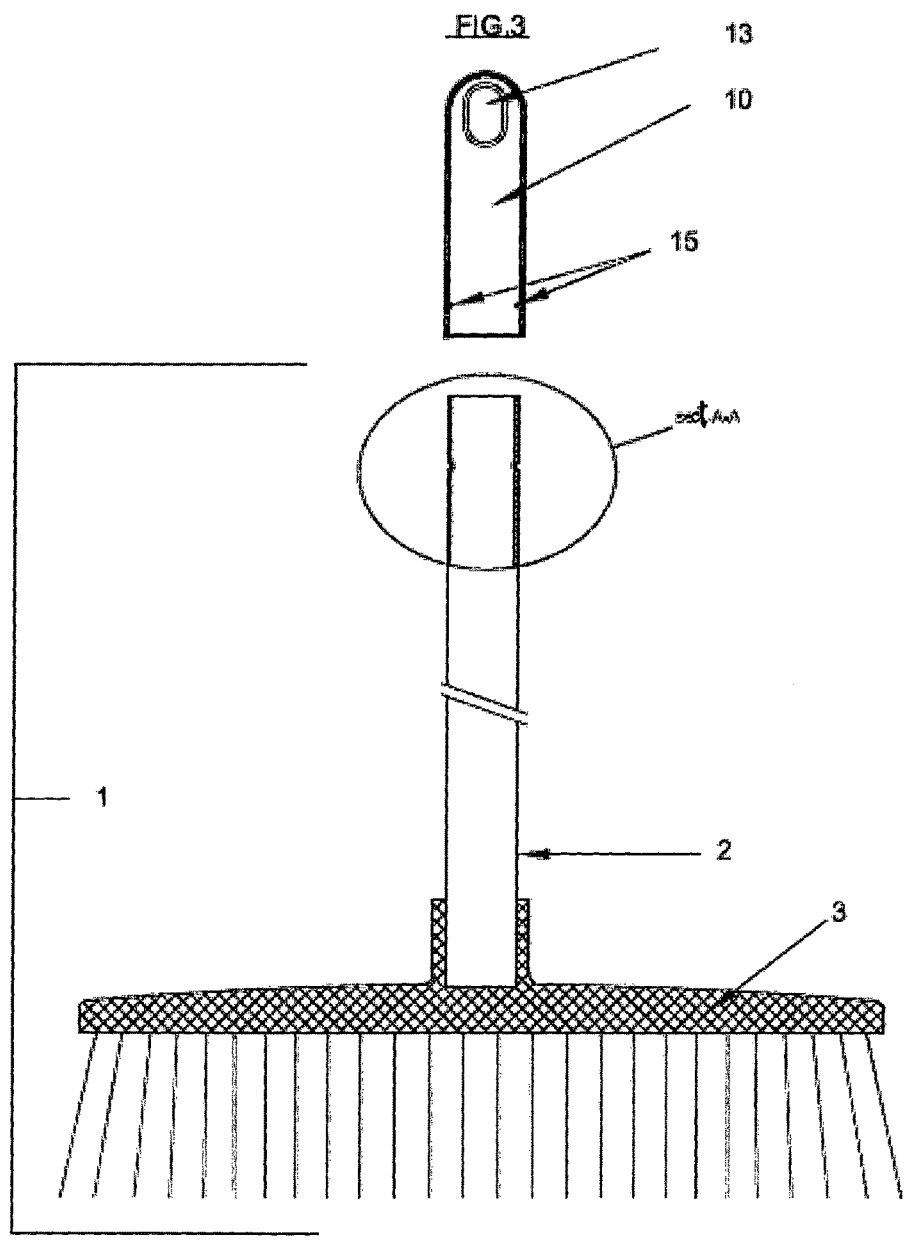

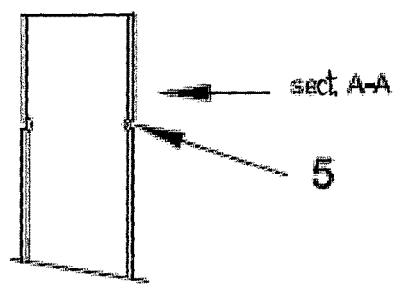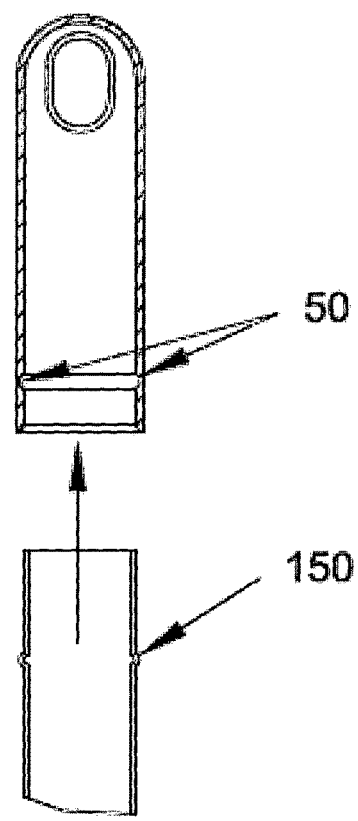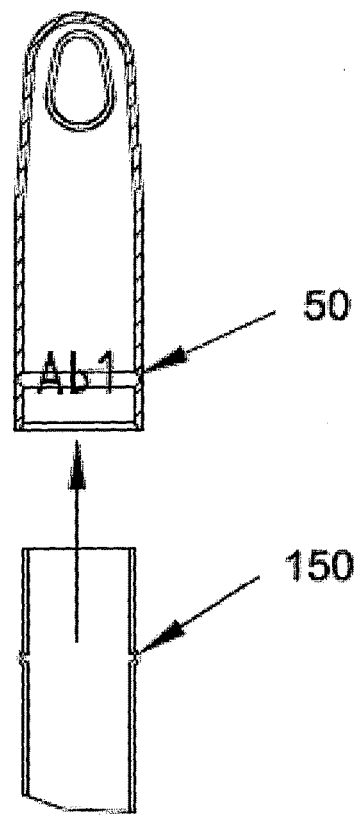

ROTATING CAP APPLIED TO THE BROOMSTICK PROVIDED WITH AN EYELET SO THAT IT CAN BE HUNG TO THE WALL

TECHNICAL FIELD

The present invention concerns the technical field relative to brooms and similar products (trowels, scrubbers, etc.) which require a broomstick in a single piece, telescopic or multi-piece.

In particular, the invention refers to an innovative cap, particularly long-lasting and of low production cost, applied to the end of the broomstick, which allows to hang it to the wall.

BACKGROUND ART

Brooms 102, as per FIG. 1 of the Prior Art, have long been known, which are applied to the end of a broomstick 101 to be used. In the other end of the broomstick, being it of wood, varnished metal or laminated metal, a cap 103 is foreseen, composed of two parts, whose superior part results rotatable with respect to the part assembled on the broomstick by mechanical interference, and has an eyelet or a hook that allows to hang the entire tool 100 to the wall.

A fundamental feature is that by which the cap has to be rotatable with respect to the broomstick on which it is assembled, so that the tool 102 can be positioned in parallel to the wall when, after use, it has to be placed again in a box room or hung directly to the wall.

FIGS. 2, 2A and 2B describe structurally in detail some solutions of background art.

The three figures of Prior Art show alternative solutions in which the cap 103 is formed by a superior part 104 connected in a rotatable manner to an inferior part 106.

For example, FIG. 2 presents the inferior part with a circular protuberance 107" and the superior part with an internal circular groove 107', which once assembled with a certain clearance, allow the rotation of one with respect to the other one.

FIG. 2A has the protuberance 107" and the internal circular groove 107' inverted with respect to the solution of FIG. 2 but the technical effect is obviously the same.

One of the other solutions of the background art is the one illustrated in FIG. 2B, which foresees a pip with head 108 on the superior part of the cap and a hole 109 inside of which the head 108 is inserted. Once assembled, the result is the relative rotation between both parts.

Also in this case the pip and the hole can be inverted on the two parts to be assembled.

In all the solutions described, the inferior part of the cap 106 is inserted on the broomstick by mechanical interference. The superior part 104 has in the final part an eyelet 105, a hook or similar (of various forms), to hang the broom to the wall.

The solutions described, however, present some technical inconveniences.

First of all, the cap as a whole is constituted of two separate components (superior part and inferior part) which are assembled between them in the production phase. Such a production solution requires two molds and engages two molding presses with an appropriate assembling machine. This solution is obviously expensive.

Another solution can foresee the automatic-assembly during the molding phase, but in this case the mold results structurally very complex and also the molding machine has to present special features (double injection). It is clear that this solution has very high production costs and requires many elaboration phases.

The seal of the tubular part of the cap 106 (the inferior part), obtained by inserting the cap on the broomstick by mechanical interference, as time passes loses efficiency due to the adaptation of the plastic due to the thermal variations and the stresses impressed by the user. It has been verified that as time passes it is possible that the cap withdraws from the broomstick, rendering it particularly dangerous because, being it realized of a sheet metal of a few tenths di millimeter, when it is not protected by the cap, it results particularly cutting.

DISCLOSURE OF INVENTION

It is therefore the aim of the present invention to provide an innovative broomstick for a broom provided with a cap 10 that solves said technical inconveniences.

In particular, it is the aim of the present invention to provide an innovative broomstick for a broom provided with a cap 10 in which, even if the cap allows a rotation of the broomstick, it does not present anyway the problem of the detachment from the broomstick and does not imply high production costs.

These and other aims are therefore reached with the broomstick (2) for a broom (3) comprising a cap (10) as per claim 1.

The cap has a first part that is connected to an end of the broomstick 2 and a second part provided with hanging means (13) to allow to hang the broomstick (10) to the wall.

In accordance with the invention, the connection between said first part of the cap (10) and the broomstick is now rotatable in such a way that the cap can rotate with respect to the broomstick and vice-versa.

Unlike the background art, in which such a connection was by interference, this coupling makes that the cap does not feel the effects of thermal differences and stresses exerted by the user, therefore being long-lasting.

Being now the connection rotatable between the first part of the cap and the broomstick, it is not necessary anymore to realize the cap in two separate parts to couple in a rotatable manner between them.

The cap is now in a single piece in such a way that a rotation of the first part of the cap corresponds to a rotation of the second part of the cap.

The production process results now much cheaper and simpler. Two different molds and coupling machines are not necessary anymore between the two parts.

Further advantages can be then deduced from the dependent claims.

BRIEF DESCRIPTION OF DRAWINGS

Further features and advantages of the invention will result clearer with the description that follows of some of its embodiments, made to illustrate but not to limit, with reference to the annexed drawings, wherein:

Figures from 1 to 2B show some possible constructive solutions of cap-broomstick coupling in accordance with the background art;

FIG. 3 shows in section a cap inserted on the broomstick of the broom in accordance with the present invention in a first embodiment;

FIGS. 4, 5 and 5A show possible variants.

DESCRIPTION OF SOME PREFERRED EMBODIMENTS

Figure 1:
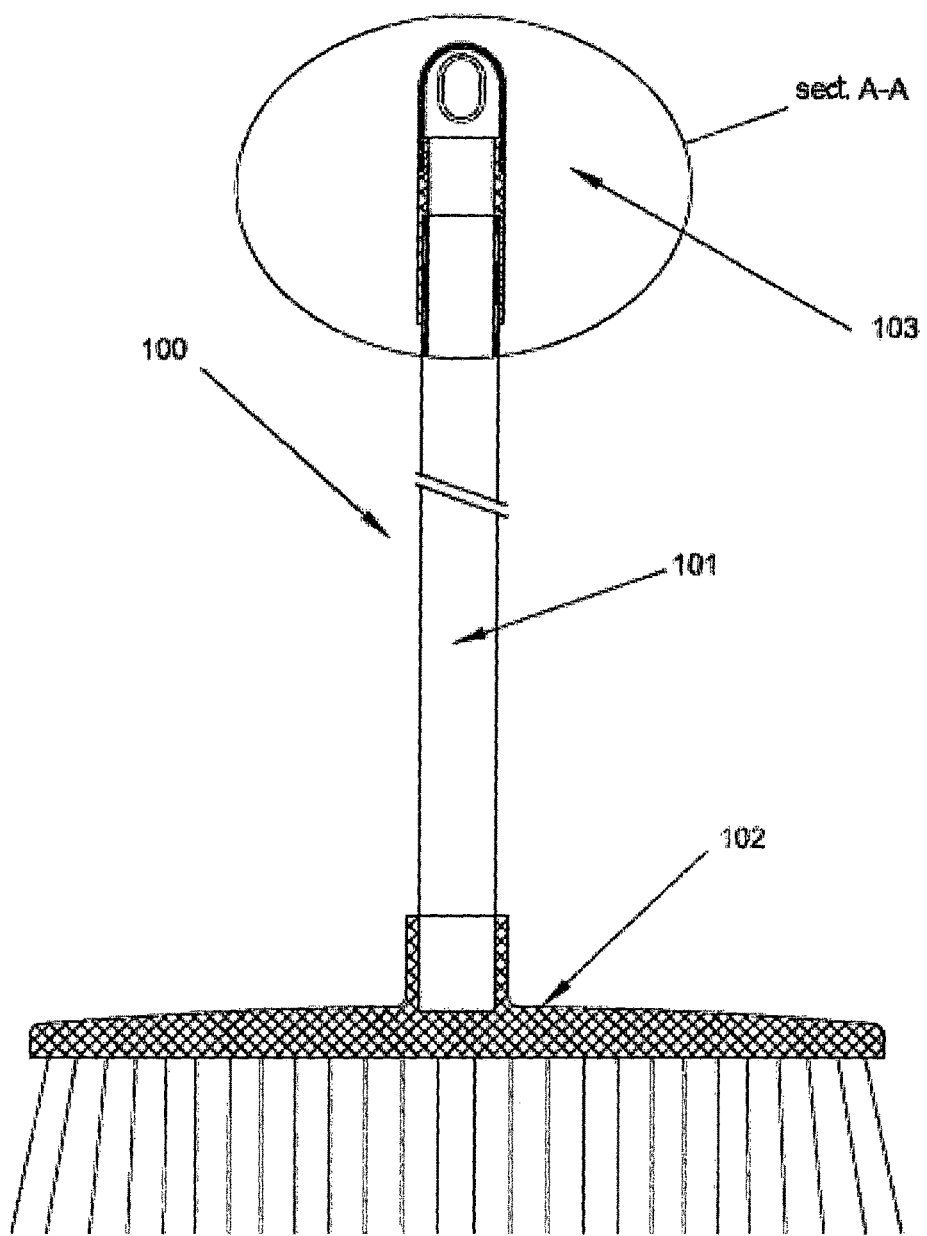

FIG. 3 shows a first embodiment of the invention. In particular, the figure shows, with number 1, the assembly of the broomstick 2 that is connected to the bristled part 3. (the broom in this example, but any other cleaning tool could be applied). With number 10 the cap 10 is indicated, which is connected in a rotatable manner to the broomstick 2. The cap always foresees an inferior part similar to a sleeve and that forms a channel for the coupling to the broomstick and a superior part provided with hanging means 13 to hang the assembly (1, 10) to the wall (for example in the shape of an eyelet or a hook 13). In accordance with the invention the cap, applied to the end of the broomstick, is now realized in a single piece on which the eyelet or the hook 13 is obtained for the hanging to the wall.

In accordance with the invention, as shown in the enlargement A-A of FIG. 4, the broomstick presents in proximity of its end, opposite to that of application of the bristled part, a notching 5 that runs circularly around the circumference of the broomstick. The circular notching engages inside the cap 10 of FIG. 3, with a circular protuberance 15 obtained inside the channel.

The cap 10 is in a single body that foresees the eyelet 13 and can be realized, for example, of plastic by molding.

It is clear that the realization of the cap 10 in a single piece simplifies significantly the production process because it is now necessary a single mold, unlike in the system of the background art, as previously described.

That being said, going back to FIG. 3, inside the cap 10 are highlighted one or more protuberances 15 which can have the form of a single circular protuberance, that is that runs along the entire circumference of the sleeve, or at sections of variable number. The sleeve is internally hollow to be applied on the broomstick. Such a protuberance 15 is suitable for engaging with the relative notching 5 of FIG. 4 when the broomstick 2 is precisely assembled to the cap 10.

By selecting a diameter of broomstick and cap so that one (the end of the broomstick) is inserted inside the other one (the channel formed by the sleeve) with a certain clearance, a rotatable coupling is obtained. In particular, the protuberance/s 15 is/are inserted in the notchings 5 and the coupling obtained is rotatable. The notching 5 therefore forms a sliding track for the protuberance 15. In particular, the cap 10 can freely rotate with respect to the broomstick and vice-versa, having impeded the translation and therefore the withdrawal of the cap with respect to the broomstick being impeded.

This solution is advantageous since the coupling is very simple and, above all, is long-lasting because, unlike the above described background art described, the cap is prevented from withdrawing from the broomstick thanks precisely to this coupling that uses the protuberance that is inserted into the relative circular seat 5 obtained around the external diameter of the broomstick, and not by being inserted by interference, but with minimum clearance, and does not feel the effects of thermal differences and stresses exerted by the user.

It is clear that if the seat or notching 5 is circular (that is continuous along the entire external diameter of the broomstick) the broomstick will be able to rotate freely with respect to the cap of 360°. Nothing would impede to realize a notching of an inferior length, allowing more limited rotations, for example of just 180°.

FIG. 5 shows an obvious variant that, in fact, is an inverted solution with respect to the preceding one.

The figure shows how in this variant a notching 50 can be obtained inside the sleeve of the cap and the relative complementary teeth 150 can be on the end of the broomstick.

In a third variant of the invention, not described in figure, a first part of the cap could be foreseen (the inferior part) that is inserted into a channel formed in the broomstick. In this case, therefore, the broomstick has to form a holding channel inside of which the inferior end of the cap is inserted, which can therefore be full. The coupling takes place also in this case with clearance and the ordinary first and second connection means are foreseen for allowing the free relative rotation between the parts, but impeding that the cap withdraws from the broomstick.

It is clear that the present invention is applicable not just to brooms but to all the category of cleaning devices that foresee also wiping rags for washing the floors, trowels, industrial brushes and to all types of wooden, metal in a single piece, telescopic or multi-piece broomsticks, both varnished or laminated, and of any diameter that foresees a rotatable cap.

It is also clear that the external form of the cap can be of any type (cylindrical, bulge formed with lines or smooth, with close eyelet or with open hook), with writings in relief or embedded, with writings engraved up to the internal part, see FIG. 5A of the cap, etc.

The invention claimed is:

1. An assembly of a cap and a broomstick for a broom comprising:
   a cap having a first part that is connected to an end of the broomstick and a second part provided with a hanging element configured to hang the broomstick to a wall,
   wherein said first part of the cap and the broomstick are rotatably coupled, enabling the cap, after coupling, to rotate with respect to the broomstick, and the broomstick to rotate with respect to the cap, while preventing a longitudinal sliding of the cap with respect to the broomstick,
   wherein the cap is made in a single piece, such that a rotation of the first part of the cap corresponds to a rotation of the second part of the cap, and
   wherein the first part of the cap and the broomstick are rotatably coupled by having a protuberance defined on the first part of the cap engage a circular notching defined in a body of the broomstick without any intermediate member or members between the cap and the broomstick, such to provide a direct contact between the cap and the broomstick.

2. The assembly, as per claim 1, wherein a coupling between said protuberance and said circular notching is configured to have a sufficient clearance to allow said rotation.

3. The assembly, as per claim 1, wherein said first part of the cap defines a channel into which an end of the broomstick without the intermediate members is inserted.

4. The assembly, as per claim 1, wherein said first part of the cap is inserted into a channel obtained in an end portion of the broomstick.

5. The assembly, as per claim 4, wherein said channel is cylindrical.

6. The assembly, as per claim 1, wherein said hanging element (13) is in a shape of an eyelet or of a hook.

7. The assembly, as per claim 1, wherein the cap is made of plastic.

8. The assembly, as per claim 7, wherein the cap is manufactured by molding.

9. The assembly, as per claim 1, wherein said first part is an inferior part of the cap and said second part is a superior part of the cap.

10. The assembly, as per claim 1, wherein said protuberance is a circular protuberance.

11. A method of producing an assembly formed by a cap coupled to a broomstick, the method comprising:
- injecting into a mold a liquid material for forming a cap, the mold being configured to form the cap in a single piece, having a superior part and an inferior part, the superior part being provided with a hanging element and the inferior part having a first connection element shaped as a protuberance;
- providing a broomstick having a second connection element shaped as a circular notching defined in a body of the broomstick; and
- coupling the cap to the broomstick without any intermediate member or members therebetween so that the superior and the inferior parts are mutually rotatable while preventing a longitudinal sliding of the cap with respect to the broomstick.

12. The methods, as per claim 11, wherein said protuberance is a circular protuberance.

\* \* \* \* \*